(12) United States Patent
Evans

(10) Patent No.: US 9,376,048 B2
(45) Date of Patent: Jun. 28, 2016

(54) STOWABLE FLOOR ASSEMBLY FOR PACKAGE DELIVERY VEHICLES

(71) Applicant: Globe Composite Solutions, Ltd., Rockland, MA (US)

(72) Inventor: Brian Charles Evans, Marshfield, MA (US)

(73) Assignee: Globe Composite Solutions, Ltd., Stoughton, MA (US)

( * ) Notice: Subject to any disclaimer, the term of this patent is extended or adjusted under 35 U.S.C. 154(b) by 0 days.

(21) Appl. No.: 14/684,157

(22) Filed: Apr. 10, 2015

(65) Prior Publication Data

US 2015/0225021 A1     Aug. 13, 2015

Related U.S. Application Data

(60) Provisional application No. 61/938,179, filed on Feb. 11, 2014.

(51) Int. Cl.
*B62D 25/20*     (2006.01)
*B60P 1/00*     (2006.01)
*B60P 3/00*     (2006.01)

(52) U.S. Cl.
CPC . *B60P 1/00* (2013.01); *B60P 3/007* (2013.01); *B62D 25/2054* (2013.01); *Y10T 16/5327* (2015.01); *Y10T 403/7064* (2015.01)

(58) Field of Classification Search
CPC .... B62D 33/02; B62D 33/07; B62D 33/0207; B62D 25/2054; B62D 53/062; B60P 1/64; B60P 1/00
USPC ........ 296/184.12, 24.4, 24.44, 37.6; 105/404, 105/370, 422; 410/89
See application file for complete search history.

(56) References Cited

U.S. PATENT DOCUMENTS 1,351,125 A     8/1920   Rex
2,071,257 A     2/1937   Hansen
(Continued)

FOREIGN PATENT DOCUMENTS

JP        2001314307 A     11/2001

OTHER PUBLICATIONS

International Search Report and Written Opinion for PCT/US2015/025453 mailed Aug. 19, 2015 (11 pages).

*Primary Examiner* — Gregory Blankenship
(74) *Attorney, Agent, or Firm* — Gardere Wynne Sewell, LLP; Andre Szuwalksi; John May

(57) ABSTRACT

A stowable floor panel system includes a horizontal railing coupled to a sidewall of a package delivery vehicle where the horizontal railing includes an upper and a lower track that are spaced apart from each other. The upper track defines an upper channel, and the lower track defines a lower channel. A hinge assembly couples a stowable floor panel to the horizontal railing. A hinge body has a plurality of relief features and an upper projection extending from a rail receiving body portion and a lower projection extending from the rail receiving body portion opposite the upper projection. When the hinge body is inserted in the railing and rotated 90 degrees the upper projection seats in the upper channel, and the lower projection seats in the lower channel. A hook assembly maintains the stowable floor panel in a stowed position and includes a cam block with a cam surface that is configured to direct the hook to a rest position with the hook-shaped portion disposed generally parallel to the sidewall of the package delivery vehicle.

22 Claims, 9 Drawing Sheets

(56) References Cited

U.S. PATENT DOCUMENTS

| | | | |
|---|---|---|---|
| 2,149,015 A | 2/1939 | Giddings | |
| 2,636,772 A | 4/1953 | Bridge | |
| 2,825,600 A * | 3/1958 | Macomber | B60P 3/00 105/370 |
| 3,875,871 A * | 4/1975 | Thornton | B61D 3/04 105/375 |
| 3,897,971 A | 8/1975 | Evans | |
| 3,911,832 A * | 10/1975 | Vandergriff | B60R 7/00 105/372 |
| 4,281,870 A | 8/1981 | Ehrlich et al. | |
| 4,928,350 A | 5/1990 | Morgan | |
| 4,995,322 A | 2/1991 | Frederick | |
| 5,042,863 A | 8/1991 | Fraga | |
| 5,375,534 A * | 12/1994 | Adams | B60P 7/135 105/372 |
| 5,452,972 A | 9/1995 | Adams | |
| 5,690,466 A * | 11/1997 | Gaddis | B60P 1/40 296/184.1 |
| 6,152,312 A | 11/2000 | Nava et al. | |
| 6,585,306 B1 * | 7/2003 | Smith | B60P 1/00 296/24.44 |
| 6,854,400 B2 * | 2/2005 | Sullivan | B60P 1/00 105/372 |
| 7,370,899 B2 * | 5/2008 | Powers, Jr. | B60P 1/00 296/186.1 |
| 2001/0035664 A1 | 11/2001 | Steffens et al. | |
| 2002/0098071 A1 | 7/2002 | Henderson | |
| 2004/0251389 A1 | 12/2004 | Oddsen | |
| 2006/0180623 A1 | 8/2006 | Reynolds et al. | |
| 2006/0225609 A1 * | 10/2006 | Rueger | C09C 1/0051 106/31.9 |
| 2007/0041803 A1 | 2/2007 | Whitehead et al. | |
| 2007/0062003 A1 | 3/2007 | Sullivan | |
| 2008/0012372 A1 * | 1/2008 | Squyres | B60P 1/00 296/24.44 |
| 2014/0061272 A1 | 3/2014 | Balthes et al. | |
| 2014/0110960 A1 * | 4/2014 | Gilbert | B62D 25/2054 296/24.44 |
| 2015/0225021 A1 * | 8/2015 | Evans | B60P 3/007 296/24.4 |

* cited by examiner

STOWABLE FLOOR ASSEMBLY FOR PACKAGE DELIVERY VEHICLES

PRIORITY CLAIM

This application claims priority from U.S. Provisional Patent Application No. 61/938,179 filed Feb. 11, 2014, entitled "Hinge and J-Hook Inventions Related To: Hinged Load Panel for Package Delivery Vehicles," which is hereby incorporated by reference.

RELATED APPLICATIONS

This application is related to U.S. patent application Ser. No. 14/102,282 filed Dec. 10, 2013, entitled "Hinged Load Panel for Package Delivery Vehicle," which claims priority to U.S. Provisional Patent Application No. 61/735,319, filed on Dec. 10, 2012, and to U.S. Provisional Patent Application No. 61/878,725 filed Sep. 17, 2013, the disclosures of which are incorporated by reference.

TECHNICAL FIELD

This disclosure relates in general to mechanisms for storing and transporting packages, parcels and other objects in a delivery vehicle, and, in particular, but not by way of limitation, to an improved load panel, hinge and railing which provides for improved structural strength, durability and functionality.

BACKGROUND

In the package/parcel shipping and distribution industry, trucks, trailers and other vehicles are some of the primary mechanisms used to transport goods. In order to cost-effectively transport goods using such vehicles, the volume of the truck and/or trailer is often filed to the maximum extent possible. Unfortunately, filling the volume of a truck and/or trailer to a maximum capacity often results in disorganized packing and damage to packages, as well as creating difficulties while loading and unloading packages.

To facilitate more efficient loading and unloading, as well as to provide for more organized and safe transport of goods, trailers and/or trucks are sometimes equipped with organizational systems to subdivide the truck/trailer. Unfortunately, many of these organizational systems are ineffective and/or require frequent maintenance and repair.

SUMMARY

Embodiments disclosed include a stowable floor panel assembly for use with a package delivery vehicle. A stowable floor panel system includes a horizontal railing coupled to a sidewall of a package delivery vehicle where the horizontal railing includes an upper and a lower track that are spaced apart from each other. The upper track defines an upper channel, and the lower track defines a lower channel. A hinge assembly couples a stowable floor panel to the horizontal railing. A hinge body has a plurality of relief features and an upper projection extending from a rail receiving body portion and a lower projection extending from the rail receiving body portion opposite the upper projection. When the hinge body is inserted in the railing and rotated 90 degrees the upper projection seats in the upper channel, and the lower projection seats in the lower channel. A hook assembly maintains the stowable floor panel in a stowed position and includes a cam block with a cam surface that is configured to direct the hook to a rest position with the hook-shaped portion disposed generally parallel to the sidewall of the package delivery vehicle.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE FIGURES

The accompanying drawings facilitate an understanding of the various embodiments.

DETAILED DESCRIPTION

Figure 1:
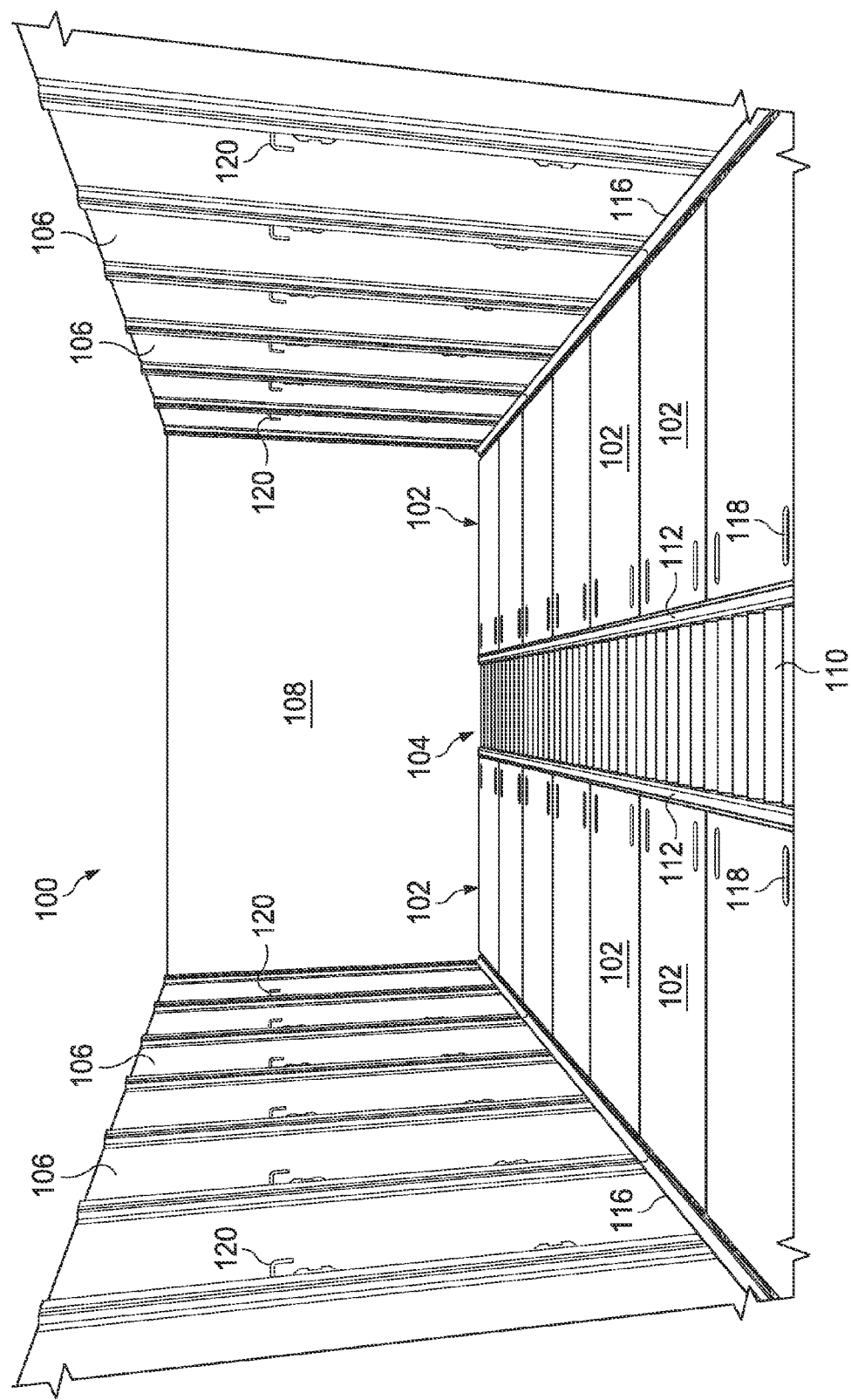
FIG. 1 is a perspective view of an interior storage area of a package delivery vehicle including a roller conveyor assembly and a plurality of panels in the load bearing position.

FIG. 1 is a perspective view of an interior of a storage area of a package delivery vehicle 100 employing stowable floor panels 102 according to the teachings of the present disclosure. When deployed, the stowable floor panels 102 create an elevated floor to support packages and loading personnel to allow the full interior height of the vehicle to be reached and loaded with packages. The vehicle 100 may be a trailer vehicle, a panel van type vehicle, a container vehicle, or any other vehicle suitable for carrying packages, parcels or other objects. The vehicle 100 includes sidewalls 106 and a rear wall 108. Not shown is a front wall generally formed by or including one or more latchable doors. Extending along the length of the vehicle 100 in a position generally centered between the sidewalls 106 is a roller conveyor assembly 104. The roller conveyor assembly 104 is generally a non-motorized system formed by a plurality of freely rotating rollers 110 supported at either end by a pair of opposed side rails 112. The vehicle 100 further includes a floor 124 (see FIG. 2). The roller conveyor assembly 104 is supported by a support frame system in an elevated position above the vehicle floor 124.

The stowable floor panels 102 extend between the sidewall 106 and the side rail 112 on either side of the roller conveyor assembly 104. Each side wall 106 is fitted with a horizontal railing 116. Thus, each panel 102 is suspended between the horizontal railing 116 and the side rail 112 when deployed in the load bearing position, as shown in FIG. 1. Although not shown in FIG. 1, but shown in FIG. 2, when the load panels 102 are deployed in their load bearing position, the edge of each load panel 102 is pivotally connected to the edge railing 116. This permits the panels 102 to be moved between a load bearing position, as shown in FIG. 1, and a stored position adjacent the side walls 106 of the vehicle 100, as shown in FIG. 2.

Each panel 102 may include one or more finger openings 118 to permit an operator to grab the load panel 102 near the free edge of the panel 102 at the side rail 112 and raise the panel 102 to the stored position adjacent the side walls 106 of the vehicle 100. As will be discussed in more detail below, the load panels 102 may also be biased toward the stored position by one or more biasing elements, such as springs coupled to the panels 102. A J-hook 120 that includes cammed rotational motion is also provided on the side walls 106 of the vehicle 100 to retain the load panels 102 in the stored position and to return the J-hook 120 to a retracted position.

Figure 2:
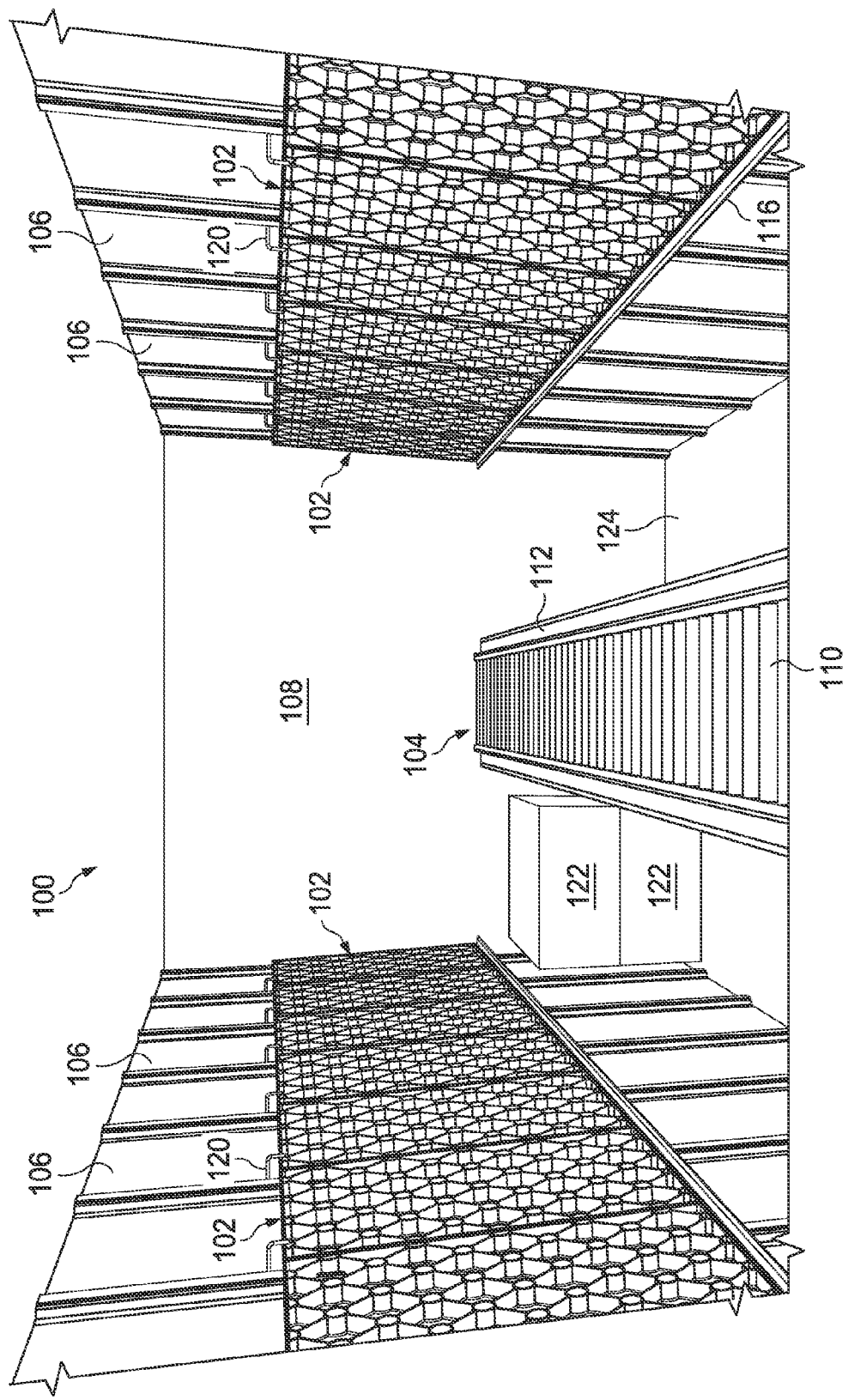
FIG. 2 is a perspective view of the interior storage area of FIG. 1 in which the panels are in the stored position.

FIG. 2 is a perspective view of the interior storage area of the package delivery vehicle 100 of FIG. 1 in which the panels 102 are in the stored position. As depicted in FIG. 2, packages 122 and other objects can be stored below the panels 102. The stored position permits access to the floor 124 of the vehicle 100 allowing for the storage of packages 122 and/or parcels below the level of the panels 102 (when in the load bearing position) and the conveyor assembly 104. Then, the panels 102 can be moved to the load bearing position and further packages 122 or other objects can be placed on top of the panels 102. The panels 102 are retained in the illustrated stowed position by the J-hooks 120.

The panel 102 may be made of any suitable material. In some embodiments, for example, the panel 102 is made of a thermoplastic, thermosetting plastic and/or an epoxy. In some embodiments, the panel 102 is reinforced with another material, such as glass or other types of reinforcing fibers, microspheres or other fillers to create the appropriate combination of weight, strength, impact resistance and resilience for a particular application. The panel 102 and support structures may be one unitary piece and may be formed by any suitable forming process, such as, for example, liquid casting or injection molding.

Figure 3:
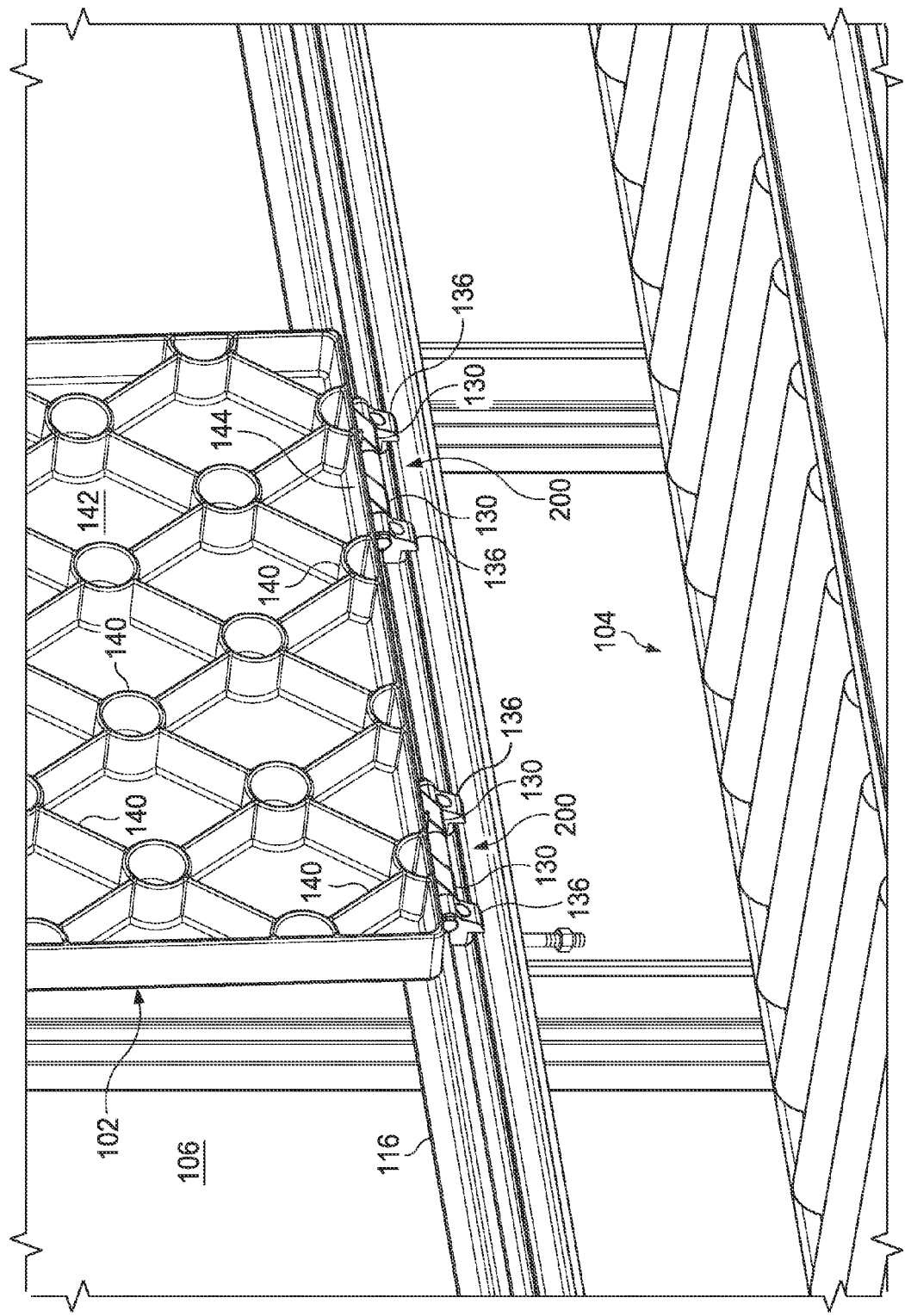
FIG. 3 is a perspective view of a panel, hinge assembly including hinge bodies and a railing in which the panel is rotatably coupled to the hinge body and the hinge body is coupled to the railing.

FIG. 3 is a perspective view of a panel 102 and two hinge assemblies 200, which each include a plurality of hinge bodies 136. FIG. 3 also shows the horizontal railing 116, in which the panel 102 is rotatably coupled to the hinge bodies 136 and the hinge bodies 136 are slideably coupled to the railing 116. The panel 102 includes a plurality of support structures 140 that form part of the bottom surface 142 of the panel 102. The support structures 140 may provide increased structural strength to the panel 102 while allowing the panel 102 to be light weight. Any suitable number and pattern of support structures 140 may be used.

The panel hinge members 130 are coupled to or formed integral with a peripheral support structure 144 of the panel 102. The peripheral support structure 144 may, as shown in FIG. 3, extend along the entire perimeter of the panel 102. The panel hinge members 130 extend from the peripheral support structure 144. The panel 102 may include any suitable number of panel hinge members 130. In the embodiment shown in FIG. 3, for example, the panel 102 includes four panel hinge members 130. In some embodiments, the panel hinge members 130 are integrally formed with the panel 102. In other embodiments, the panel hinge members 130 are attached to the panel 102.

Figure 4:
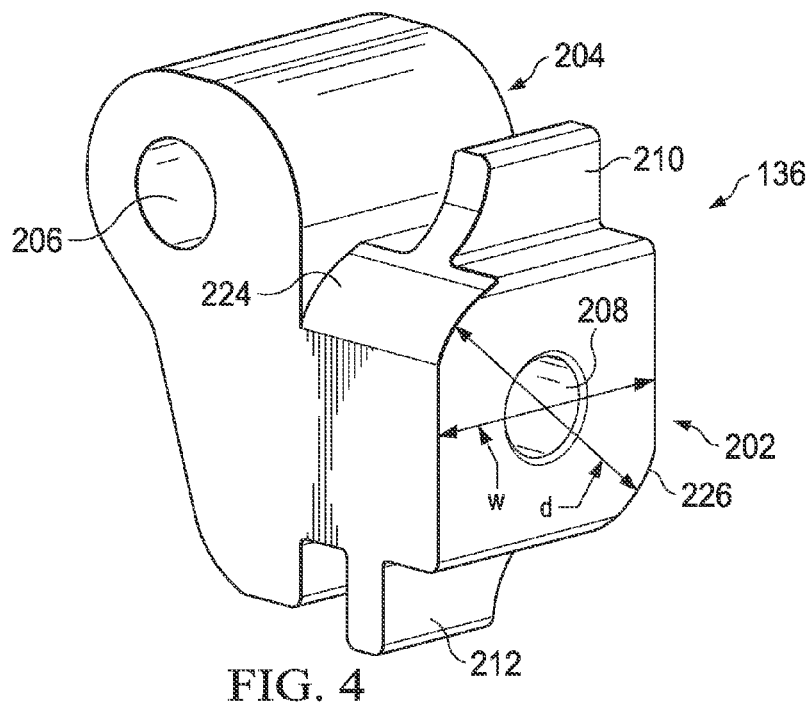
FIG. 4 is a perspective view of the hinge body shown in FIG. 3.

FIG. 4 is a perspective view of the hinge body 136 that is slidably coupled to the horizontal railing 116 and to the hinge member 130 of the stowable floor panel 102. Together with the other components of the hinge assembly 200, the hinge body 136 enables rotational motion of the panel 102 between the stowed position and the deployed load bearing position. The hinge body 136 includes a body portion 202 and an ear portion 204. A bore 206 for receiving a rod extends through the ear portion 204, and when secured to the horizontal rail 116, an axis of the bore 206 is disposed horizontally. A threaded bore 208 extends through the body portion 202. In an alternate embodiment, the bore 208 is only partially threaded. As described in more detail below, the partially threaded bore 208 receives a set screw that secures the hinge body 136 in position with respect to the horizontal rail 116. An upper projection 210 extends from the body portion 202, and a lower protection 212 extends from the body portion 202 opposite the upper projection 210.

Figure 5:
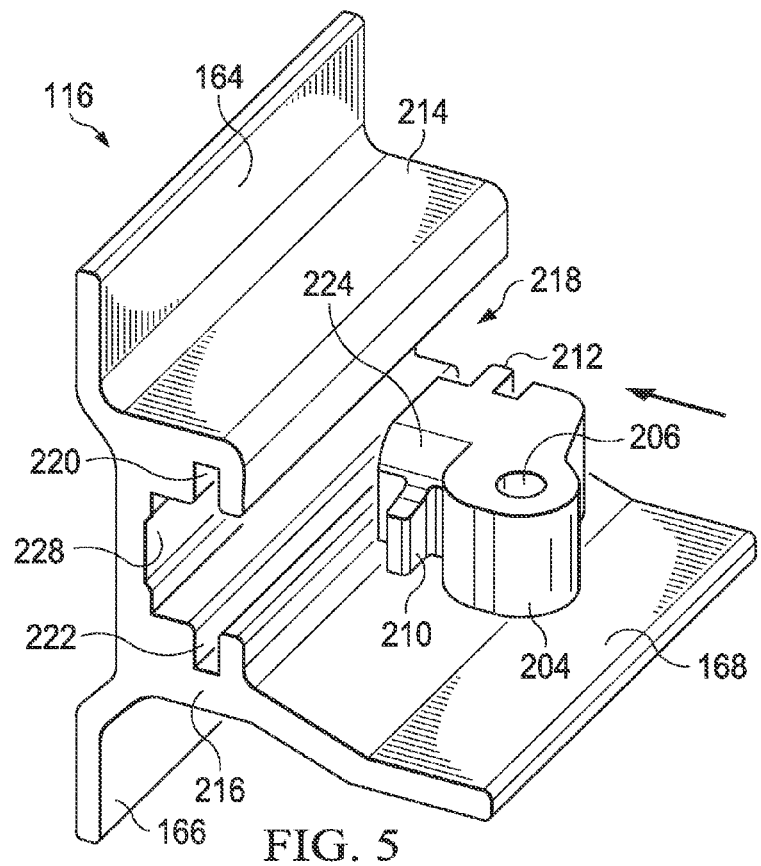
FIGS. 5-7 are perspective view showing a rotational assembly of the hinge body with the horizontal railing.
Figure 7:
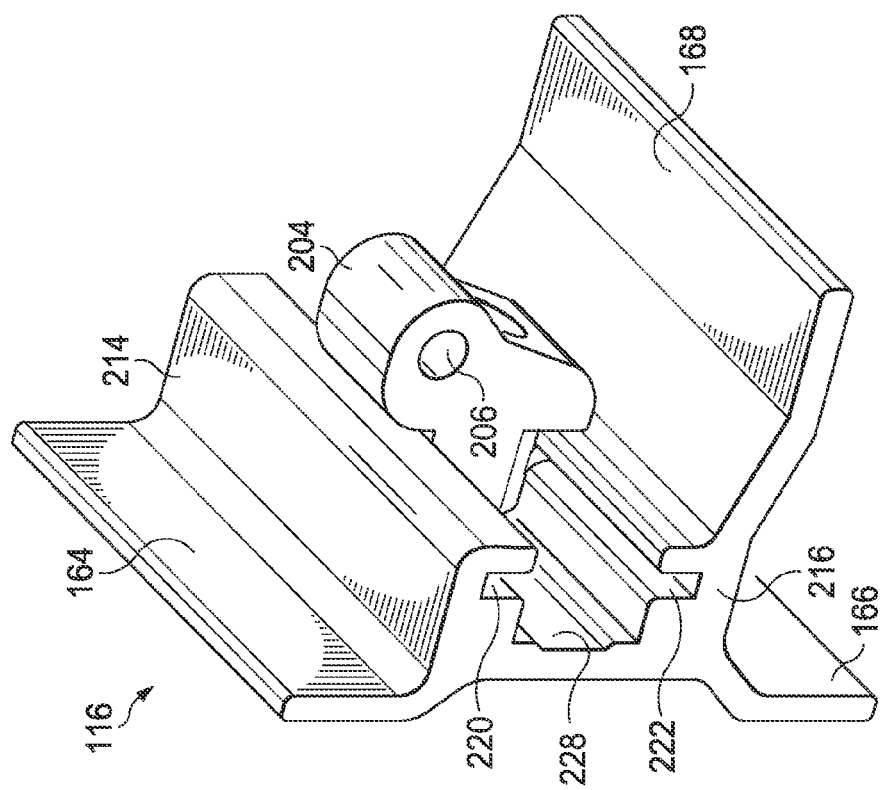
Figure 6:
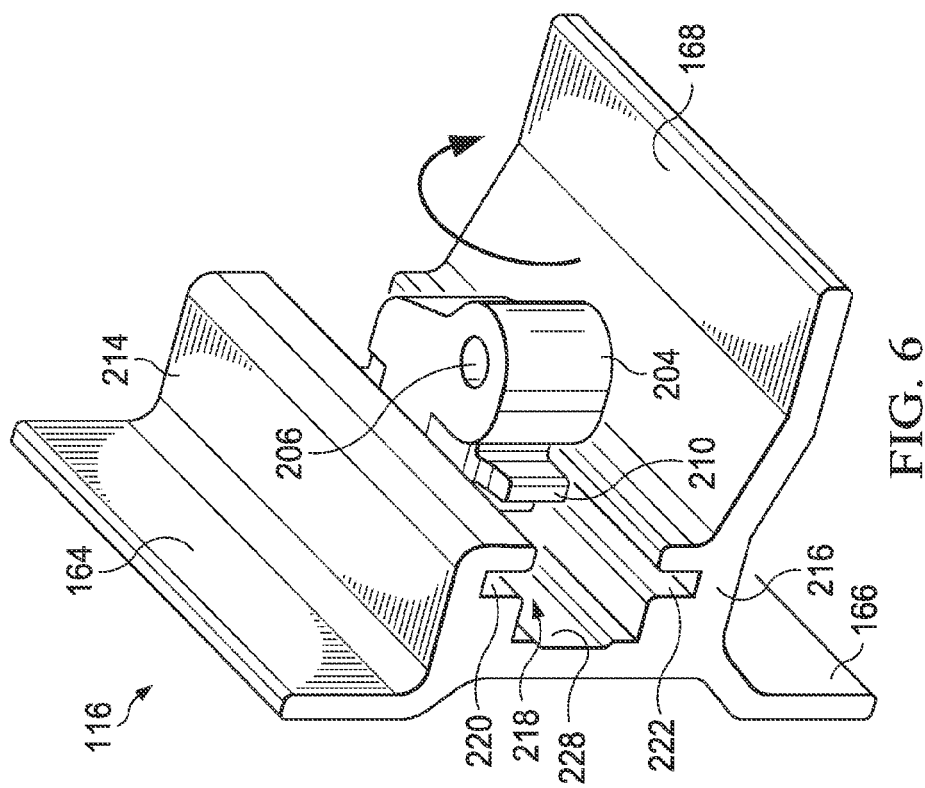

FIGS. 5-7 illustrate the assembly of the hinge body 136 to the horizontal railing 116. FIG. 5 illustrates a portion of the edge railing 116, where a first vertical flange member 164 and a second vertical flange member 166, are secured to the vehicle sidewall 106 and extend along the length of the edge railing 116. A panel support member 168 extends generally horizontally to support the panel 102 in the load bearing position. A bottom surface of one or more of the support structures 140 contacts the panel support member 168 to support at least part of the weight of the panel 102 and any objects on top of the panel 102. As explained above, an opposite side of the panel 102 contacts the conveyor assembly 104 so that at least a portion of the weight of the panel 102, along with the weight of any packages or other object on the panel 102, is supported by the panel support member 168 of the horizontal railing 116 and the conveyor assembly 104.

The hinge body 136 is oriented as shown in FIG. 5 with respect to the horizontal railing 116. A width "w" of the body portion is less than a distance an upper track 214 of the horizontal railing 116 is spaced apart from a lower track 216. According to one embodiment, the width "w" is approximately five-eighths of an inch. As such, there is a clearance when the body portion 202 is inserted into a primary channel 218 of the railing 116. The body portion 202 is inserted into the primary channel 218 such that rotation of the hinge body 136 ninety degrees clockwise causes the upper projection 210 to seat in an upper channel 220 formed in the upper track 214, and the lower projection 212 to seat in a lower channel 222 of the lower track 216, as shown in FIG. 7.

Referring back to FIG. 4, a pair of diagonally opposed arcuate relief portions 224, 226 enable the clockwise rotation of the hinge body 136. An upper arcuate relief 224 and a lower arcuate relief 226 may each be machined into the hinge body 136. The diagonal length "d" of the hinge body 136 between the relief features 224, 226 is slightly less than the distance the upper track 214 is vertically spaced apart from a lower track 216.

Figure 8:
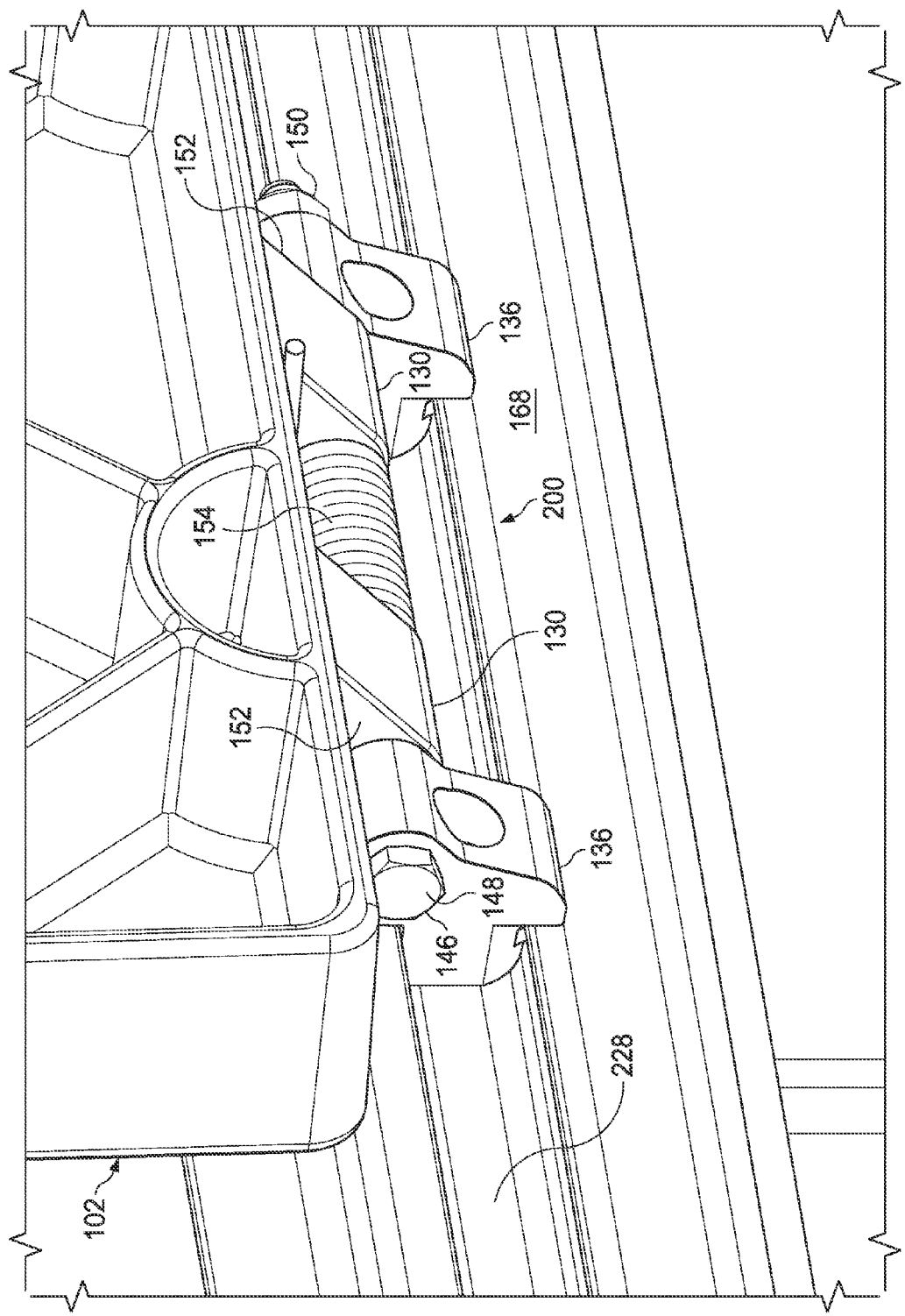
FIG. 8 is a detail view of the hinge assembly of FIG. 3.

When the hinge body 136 is in an upright position, as shown in FIG. 7, it may be slidably moved along the horizontal railing 116 to a desired position to allow it to be secured to the hinge member 130 of the stowable floor panel 102 (see FIG. 8). Once in the desired position, a set screw (not shown) is received through the set screw bore 208 in the hinge body 136 and is advanced to contact an undercut portion 228 of the horizontal railing 116 to secure the hinge body 136 in place. Because the undercut portion 176 is removed laterally from the remainder of the main channel 170, however, there is a lower chance that any such dent or deformation will interfere with the movement of the hinge body 136 with respect to the edge railing 116. In some embodiments, the set screw and the threaded portion of the bore 208 may include vibration reduction elements, such as, for example, a Nylok® Blue® Nylon Torq-Patch® material, made by Nylock of Macomb, Mich.

Employing the rotational coupling of the hinge body 136 to the horizontal railing 116 allows the hinge body 136 to be assembled at any location along the horizontal railing 116. Such installation is an improvement over other hinge body 136 installation methods that required the hinge body 136 to be inserted in an upright position at an end of the horizontal railing 116 or inserted into the horizontal railing 116 at specific locations along the railing where the upper track and the lower track had been cut-out to allow for insertion of the hinge body 136 in its upright position.

According to certain embodiments, the hinge body 136 is an extruded part. For example, the hinge body 136 may be formed of extruded aluminum or an extruded polymer, such as a composite polymer. According to certain embodiments, aluminum is extruded in the profile shape of the hinge body 136. This extruded shape is then cut to the desired width "w." This method may allow multiple hinge bodies 136 to be formed from one extrusion.

FIG. 8 is a detail view of one hinge assembly 200 supporting a stowable floor panel 102 according to the teachings of the present disclosure. Each panel 102 is secured to the horizontal railing with two hinge assemblies 200. The hinge bodies 136 are rotationally seated in the horizontal railing 116 and secured with the set screw as described above with respect to FIGS. 5-7. The panel hinge members 130 are rotatably coupled to the hinge bodies 136 by a rod 146 that extends through openings (not shown) in the panel hinge members 130 and the hinge bodies 136. The hinge bodies 136 are located on the outer edges of the panel hinge members 130 so that both of the panel hinge members 130 are located between the hinge bodies 136. In other embodiments, the hinge bodies 136 may be located at other positions with respect to the panel hinge members 130. For example, in some embodiments the hinge bodies 136 are located between the panel hinge members 130. While two panel hinge members 130 and two hinge bodies 136 are shown in FIG. 8, any number of panel hinge members 130 and hinge bodies 136 may be grouped together and any number of groups of panel hinge members 130 and hinge bodies 136 may be used to couple the panel 102 to the horizontal railing 116. For example, in some embodiments, the hinge bodies 136 and the panel hinge members 130 are grouped such that two hinge bodies 136 correspond to a single panel hinge member 130.

The rod 146, which may be, for example, a bolt and nut, passes through aligned openings made in the panel hinge members 130 and the hinge bodies 136 and may hold the hinge bodies 136 in place with respect to the panel hinge members 130 by applying an inward force from a head 148 of the rod 146 and a threaded nut 150 coupled to the rod 146. The panel hinge members 130 may have sloped side walls 152 to provide structural strength to the panel hinge members 130.

The embodiment shown in FIG. 8 also includes a biasing mechanism 154, which in the embodiment of FIG. 8 is a torsion spring 154, located between the panel hinge members 130 and surrounding the rod 146. As described above, the biasing mechanism 154 may provide a biasing force to hold the panel 102 in the stored position. In some embodiments, the biasing mechanism 154 is strong enough to hold the panel 102 in the stored position once the panel 102 has been moved to within 5-10 degrees of the stored position, but is not sufficiently strong to move the panel 102 when the panel 102 is in the load bearing position.

Figure 9:
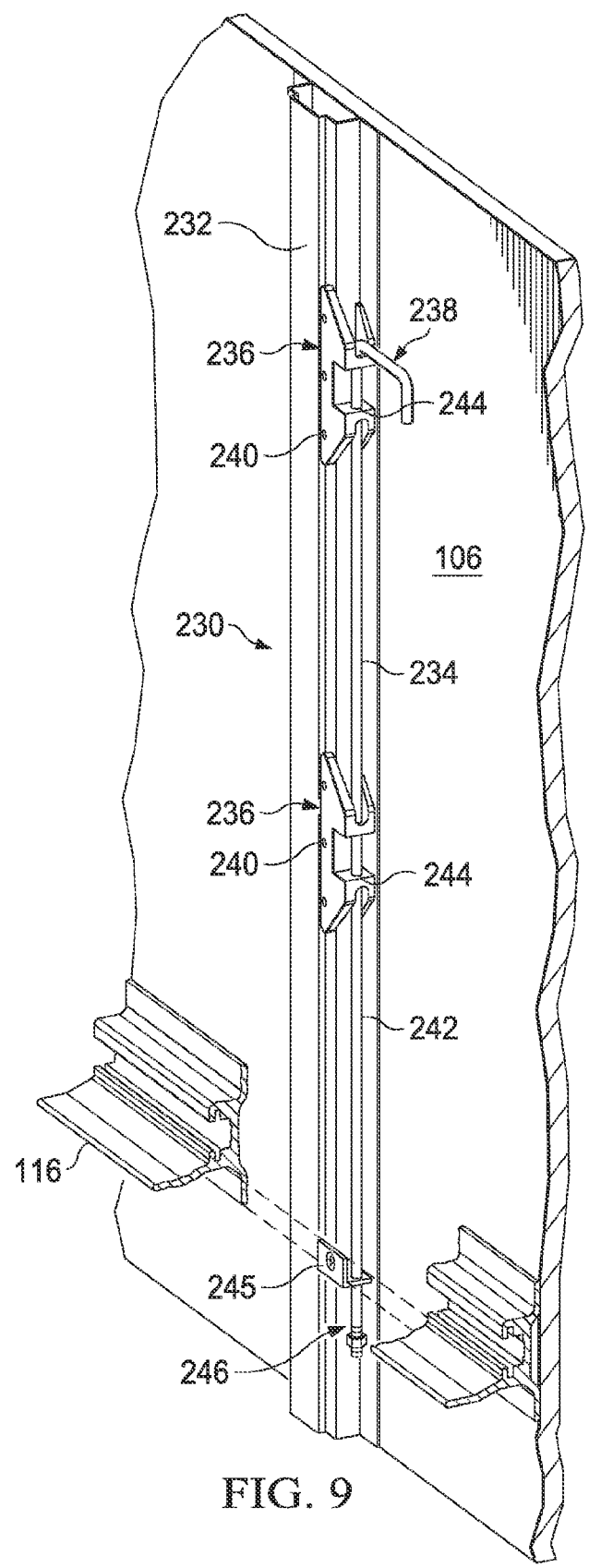
FIG. 9 is a perspective view of a J-hook assembly coupled to a sidewall of a package delivery vehicle.

FIG. 9 illustrates a J-hook assembly 230 including one of the vertical support ribs 232, which are spaced apart along the sidewall 106 of the vehicle. The J-hook assembly 230 is shown in a retracted position according to the teachings of the present disclosure. The package delivery vehicle includes multiple J-hook assemblies 230. According to one embodiment, the package delivery vehicle includes one J-hook assembly 230 for each stowable floor panel 102. The J-hook assembly 230 includes a J-hook 234 and multiple, for example two or three, cam blocks 236. The J-hook 234 may be made of any suitable material and, in some embodiments, the J-hook 234 is made of a metal bar that is bent to include a hook portion 238.

Figure 10:
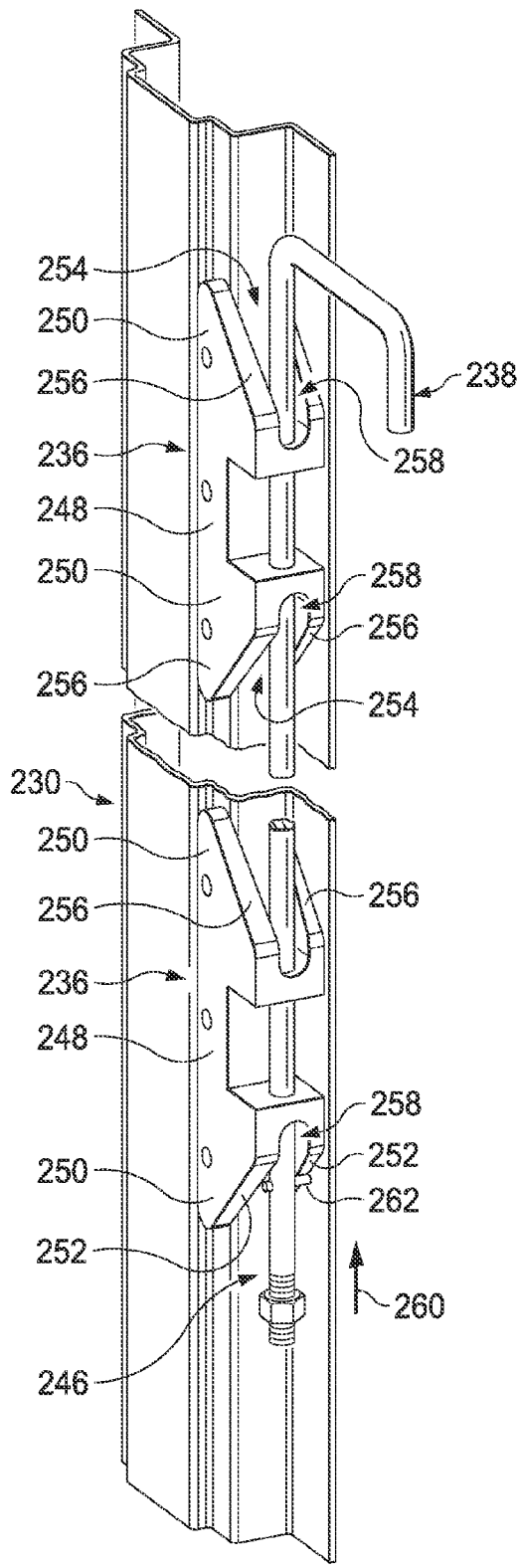
FIGS. 10-12 illustrate the operation of the cam blocks of embodiments of the J-hook assembly shown in FIG. 9.
Figure 11:
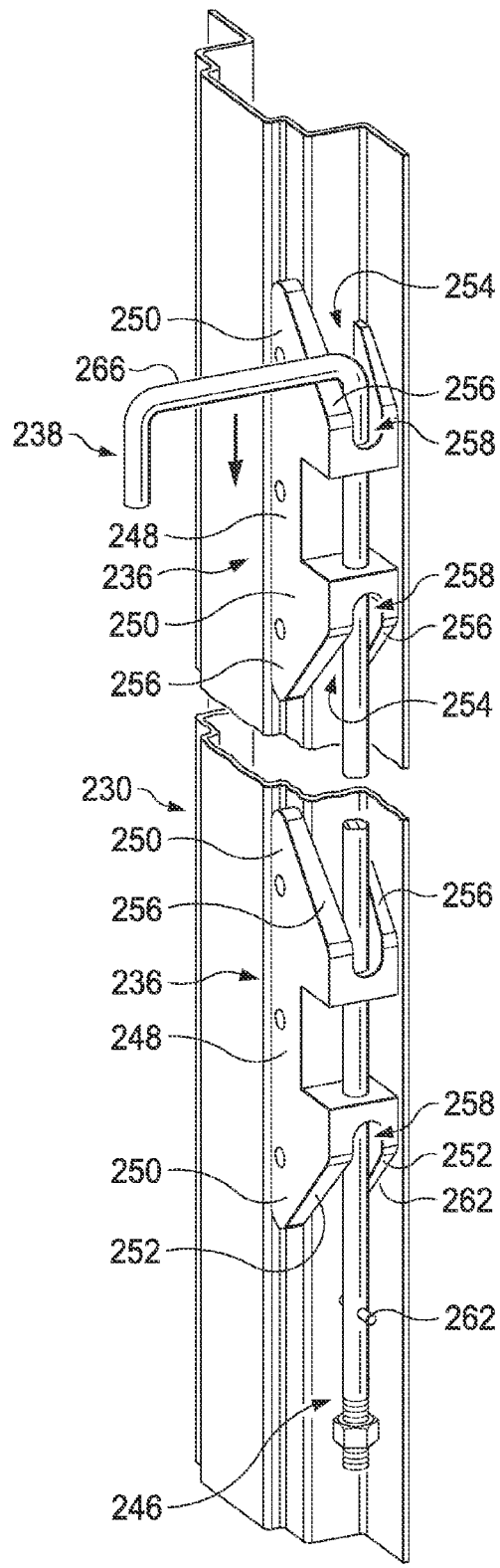
Figure 12:
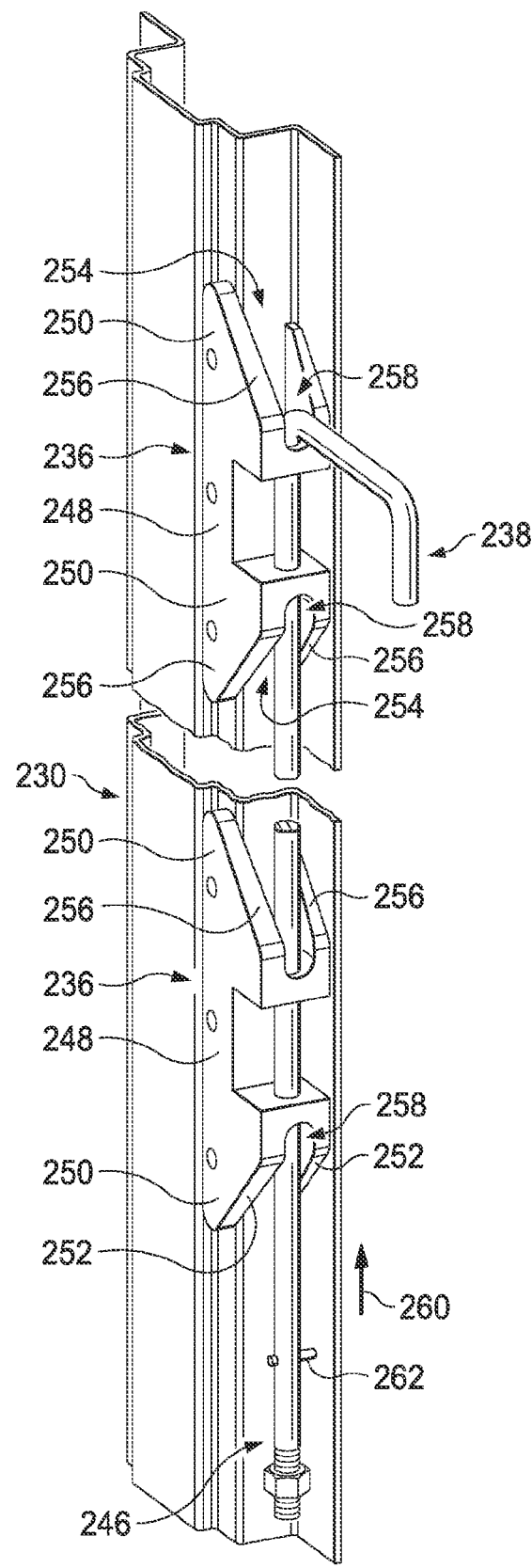

To facilitate ease of installation, each of the cam blocks 236 may be identical, and can therefore be installed as any one of an upper, intermediate, or lower cam block 236 (the lower cam block 236 is illustrated in FIGS. 10-12). The intermediate cam block 236 may be omitted, and the J-hook may be received through an upper and a lower cam block 236. The cam blocks 236 support the J-hook 234 and allow it to rotate approximately 90 degrees with respect to the longitudinal axis of the J-hook 234. The cam blocks 236 are formed from a durable composite polymer material, for example a glass-filled polycarbonate. In an alternate embodiment, the cam blocks 236 may be formed of nylon.

As explained further below, the J-hook 234 rotates between a retracted position where a hook portion 238 of the J-hook 234 is parallel to the sidewall 106 of the vehicle to an engaged position where it hooks over a portion of the stowable floor panel 102 to secure the panel 102 in a stowed position where the panel 102 is generally parallel with the sidewall 106. Each of the cam blocks 236 of a J-hook assembly 230 is secured to one vertical support rib 232, which is secured to the trailer sidewall 106. Any suitable method for attaching the cam blocks to the vertical support rib 232 may be employed. For example, the cam blocks 236 are attached by bolts, screws, or rivets, such as a monobolt rivet, or any combination of such fasteners that are received through corresponding holes 240 in the cam block 236.

A vertical rod 242 portion of the J-hook 234 is received by through holes 244 of all three cam blocks 236. A lower end 246 of the vertical rod 242 is disposed below the horizontal railing 116 to be accessible without requiring an individual to reach to the hook portion 238 in order to move the J-hook 234 (see FIG. 2). According to the embodiment illustrated in FIG. 9, a guide bracket 245 is secured to an underside of the horizontal railing 116. A through hole in the guide block 245 receives the lower end 246 of the vertical rod 242. According to certain embodiments, a stowable floor panel 102 may be approximately thirty-eight inches in length. The lower portion 246 of the elongated J-hook 234 extending below the panel 102 when the panel 102 is in the stowed position eliminates the need for an individual to reach over the panel 102 to manipulate the J-hook 234.

FIGS. 10-13 illustrate the J-hook assembly 230 detailing the upper and lower cam blocks 236 and omitting the intermediate cam block. The cam blocks 236 each include a mid-body portion 248 and a pair of opposed cam portions 250. The opposed cam portions may be identical to allow for installation without requiring a particular orientation of the cam blocks 236. The cam blocks 236 may be mounted on either side of the vertical support rib 232. Each cam portion 250 includes a pair of sidewalls 252 that are spaced apart to form a slot 254. Each sidewall 252 includes a cam surface 256. The slot 254, cam surfaces 256 and a trough 258 work in concert to direct the motion of the J-hook to rotate the J-hook 234 between a retracted position and an engaged position where the hook portion 238 engages the stowable floor panel 102 (see FIG. 2).

FIG. 10 illustrates movement of the J-hook 234 upward from the retracted position to the engaged position. An individual applies an upward force to the J-hook 234, as indicated by arrow 260. The J-hook 234 extends to below the horizontal railing 116 so it is accessible without requiring an operator to reach to the higher hook portion 238. Upon applying an upward force to the J-hook 234, a pin 262 engages the cam surface 256 of the lower cam block 236, as shown in FIG. 10.

The cam block 236 constrains the upward motion of the J-hook 234 and directs the motion of the pin 262 to rotate to seat in the trough 258. The rotation of the pin 262 corresponds to a 90 degree rotation of the hook portion 238. Thus, releasing the upward force allows gravity to direct the hook portion 238 downward and over the edge of the stowable floor panel 102, as shown in FIG. 2.

FIG. 11 illustrates the J-hook assembly 230 at an intermediate position between the engaged position of FIG. 2 and the retracted position. An upward force may be applied to the J-hook 234 to raise the hook portion 238 above the stowable floor panel 102. The stowable floor panel 102 is rotated on its hinge assemblies 200 downward toward its deployed load bearing position. After clearing a distal portion 264 of the hook portion 238, the upward force is released, and the J-hook 234 is allowed to fall. Gravity directs the J-hook 234 downward where a horizontal member 266 of the J-hook 234 contacts the cam surface 256, as shown in FIG. 11. The horizontal portion 266 slides down the cam surface 256 and rotates 90 degrees and seats in the trough 258, as shown in FIG. 12. In this manner, gravity acts on the J-hook 234 such that its relaxed state, with no external forces applied, is to be seated in the trough 258 and retracted to be parallel with the sidewall 106 and out of the way of the loading space and those loading the load vehicle.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below," "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A stowable floor panel system, comprising:
   a horizontal railing coupled to a sidewall of a package delivery vehicle, the horizontal railing comprising an upper track and a lower track, the lower track being vertically spaced apart from the upper track, the upper track defining an upper channel and the lower track defining a lower channel; and
   a hinge assembly coupling a stowable floor panel to the horizontal railing, the hinge assembly comprising a hinge body having a plurality of relief features and an upper projection extending from a rail receiving body portion and a lower projection extending from the rail receiving body portion opposite the upper projection;
   wherein rotation of the hinge body approximately 90 degrees seats the upper projection in the upper channel and the lower projection in the lower channel; and
   a hook assembly, comprising:
      a cam block defining a through hole, the cam block coupled to the sidewall of the package delivery vehicle, the cam block defining a downwardly sloped cam surface;
      a hook having an elongated rod received by the through hole and a hook-shaped portion configured to restrain a free end of the stowable floor panel in a stowed position; and
      wherein gravity causes the hook portion to contact the cam surface and the cam surface is configured to direct the hook to a rest position with the hook-shaped portion disposed generally parallel to the sidewall of the package delivery vehicle.

2. The system of claim 1 wherein the rail receiving body portion of the hinge body includes the plurality of relief features and a diagonal distance between a first relief feature and a second relief feature is less than a distance the upper track is spaced apart from the lower track.

3. The system of claim 2 wherein the first relief feature is a first arcuate surface and the second relief feature is a second arcuate surface.

4. The system of claim 1 wherein the rail receiving body portion defines a threaded through hole configured to receive a set screw, the set screw immobilizing the hinge body with respect to the horizontal railing.

5. The system of claim 1 wherein the elongated rod extends below the horizontal railing.

6. The system of claim 1 further comprising a lower cam block defining a through hole receiving a lower end of the elongated rod.

7. The system of claim 6 further comprising a pin radially extending from the lower end of the elongated rod, and wherein an upward force acting on the rod causes the pin to contact an upwardly sloping cam surface of the lower cam block, the upwardly sloping cam surface configured to direct the pin to seat in a trough of the lower cam block, and wherein seating the pin in the trough corresponds to rotation of the hook-shaped portion to an engaged position with the hook-shaped portion disposed generally perpendicular to the sidewall of the package delivery vehicle.

8. The system of claim 1 further comprising a guide bracket coupled to the horizontal railing and defining a through hole, a lower end of the elongated rod received through the through hole of the guide bracket.

9. A hinge system for a stowable floor panel, comprising:
   a horizontal railing configured to be coupled to a sidewall of a package delivery vehicle, the horizontal railing comprising an upper track and a lower track, the lower track being vertically spaced apart a distance from the upper track, the upper track defining an upper channel and the lower track defining a lower channel; and
   a hinge body configured to be coupled to the horizontal railing, the hinge body comprising:
      a through hole for receiving a hinge rod;
      an upper projection extending from a rail receiving body portion;

a lower projection extending from the rail receiving body portion opposite the upper projection; and a pair of relief features; and wherein rotation of the hinge body approximately 90 degrees seats the upper projection in the upper channel and the lower projection in the lower channel.

10. The hinge system of claim 9 wherein the rail receiving body portion includes the pair of relief features and a diagonal distance between a first relief feature and a second relief feature is less than the distance the upper track is spaced apart from the lower track.

11. The hinge system of claim 10 wherein the first relief feature is a first arcuate surface and the second relief feature is a second arcuate surface.

12. The hinge system of claim 9 wherein the rail receiving body portion defines a threaded through hole configured to receive a set screw.

13. The hinge system of claim 9 wherein the horizontal railing comprises a panel support member configured to at least partially support a stowable floor panel deployed in a load bearing position.

14. The hinge system of claim 9 wherein a width of the rail receiving body portion of the hinge member is less than the distance the upper track is spaced apart from the lower track.

15. The hinge system of claim 9 wherein the hinge member is coupled to the horizontal railing and the hinge rod is received by the through hole in the hinge member to couple the stowable floor panel to the hinge body.

16. A hook system for maintaining a stowable floor panel in a stowed position, comprising:

a cam block defining a through hole, the cam block configured to be coupled to a sidewall of a package delivery vehicle, the cam block defining a downwardly sloped cam surface;

a hook having an elongated rod received by the through hole and a hook-shaped portion configured to restrain a free end of a stowable floor panel in a stowed position, the panel being hinged at a hinged end opposite the free end; and wherein gravity causes the hook portion to contact the cam surface and the cam surface is configured to direct the hook to a rest position with the hook-shaped portion disposed generally parallel to the sidewall of the package delivery vehicle.

17. The hook system of claim 16 wherein the elongated rod extends below the hinged end of the stowable floor panel.

18. The hook system of claim 17 further comprising a lower cam block defining a through hole receiving a lower end of the elongated rod.

19. The hook system of claim 18 further comprising a pin radially extending from the lower end of the elongated rod, and wherein an upward force acting on the rod causes the pin to contact an upwardly sloping cam surface of the lower cam block, the upwardly sloping cam surface configured to direct the pin to seat in a trough of the lower cam block, and wherein seating the pin in the trough corresponds to rotation of the hook-shaped portion to an engaged position with the hook-shaped portion disposed generally perpendicular to the sidewall of the package delivery vehicle.

20. The hook system of claim 16 further comprising a lower cam block and an intermediate cam block, the elongated rod received through respective through holes in both the lower cam block and the intermediate cam block.

21. The hook system of claim 16 further comprising a guide bracket defining a through hole, a lower end of the elongated rod received through the through hole of the guide bracket.

22. The hook system of claim 21 wherein the hinged end of the stowable floor panel is coupled to a horizontal railing and wherein the guide bracket is coupled to the horizontal railing.

* * * * *